(12) United States Patent
Newell, Jr. et al.

(10) Patent No.: US 9,340,382 B2
(45) Date of Patent: May 17, 2016

(54) PRINTING DEVICE WITH MEDIA PATH FLUSHING

(71) Applicant: Hewlett-Packard Development Company, L.P., Houston, TX (US)

(72) Inventors: Lawrence B. Newell, Jr., Meridian, ID (US); Kim Brown, Boise, ID (US); Robert J. Lavey, Siloam Springs, AR (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 20 days.

(21) Appl. No.: 13/738,412

(22) Filed: Jan. 10, 2013

(65) Prior Publication Data

US 2013/0127110 A1   May 23, 2013

Related U.S. Application Data

(62) Division of application No. 10/455,588, filed on Jun. 4, 2003, now Pat. No. 8,379,233.

(51) Int. Cl.
| | |
|---|---|
| *G06F 3/12* | (2006.01) |
| *B65H 7/02* | (2006.01) |
| *B65H 5/26* | (2006.01) |
| *G03G 15/00* | (2006.01) |
| *G06K 15/16* | (2006.01) |

(52) U.S. Cl.
CPC .. *B65H 5/26* (2013.01); *B65H 7/02* (2013.01); *G03G 15/6529* (2013.01); *G06K 15/16* (2013.01)

(58) Field of Classification Search
USPC .......................................................... 358/1.1
See application file for complete search history.

(56) References Cited

U.S. PATENT DOCUMENTS

| | | | |
|---|---|---|---|
| 4,182,568 A | 1/1980 | Levine | |
| 4,247,193 A | 1/1981 | Kaneko | |
| 4,587,532 A | 5/1986 | Asano | |
| 5,003,346 A * | 3/1991 | Masuda et al. | ................... 355/57 |
| 5,045,881 A | 9/1991 | Kinder | |
| 5,138,670 A | 8/1992 | Nakajima | |
| 5,172,162 A | 12/1992 | Taneda | |
| 5,257,070 A | 10/1993 | Miller | |
| 5,268,728 A | 12/1993 | Sugiyama | |
| 5,489,968 A | 2/1996 | Rossbach | |
| 5,639,171 A * | 6/1997 | Brewster et al. | ............... 400/708 |
| 5,713,060 A * | 1/1998 | Sato et al. | ........................ 399/20 |
| 5,999,758 A | 12/1999 | Rai | |
| 6,322,069 B1 | 11/2001 | Krucinski | |
| 6,517,066 B2 * | 2/2003 | Covert et al. | ................. 271/9.13 |
| 6,762,856 B2 * | 7/2004 | Farrell et al. | ................... 358/1.8 |

* cited by examiner

*Primary Examiner* — Marivelisse Santiago Cordero
*Assistant Examiner* — Neil R McLean
(74) *Attorney, Agent, or Firm* — Rathe Lindenbaum LLP

(57) ABSTRACT

A method and article determine a greatest distance between adjacent sensors along the media path and command a flushing to advance media the determined greatest distance in the print engine and the peripheral device.

21 Claims, 2 Drawing Sheets

PRINTING DEVICE WITH MEDIA PATH FLUSHING

CROSS-REFERENCE TO RELATED PATENT APPLICATIONS

The present application is a divisional application claiming priority under 35 USC Section 120 from co-pending U.S. patent application Ser. No. 10/455,588 filed on Jun. 4, 2003 by Newell, Jr. et al. and entitled PRINTING DEVICE WITH MEDIA PATH FLUSHING, the full disclosure of which is hereby incorporated by reference.

BACKGROUND

Printing systems typically include one or more input trays for holding media (e.g., paper) with feed mechanisms for picking off one sheet of media at a time and feeding it downstream, a print engine that receives the media from the trays and prints a desired image on the media, and post-printing media handlers that sort, collate, staple, bind, stack, punch or otherwise handle the printed media. Each of the feed mechanisms, print engine, and post-printing media handlers may include several sets of rollers or belts for advancing the media along a media path, which may have an effective length equivalent to the length of several sheets of media. The printing system typically will maximize the overall print processing speed by moving several sheets of media along the media path at any given time. The sheets are tracked by sensors distributed along the path, but typically the sensors are not spaced so closely as to allow one sheet to trip a sensor at all points along the path—blind locations exist along the path.

When a sheet of media is in a blind location between two sensors, one way for the printing system to determine the location of the sheet is to advance the adjacent rollers, belts, or other drive mechanisms, until the sheet is moved to the next sensor. While printing, this occurs in the ordinary course as the drive mechanisms run substantially constantly to advance the media along the media path without concern about whether the sheet is triggering a sensor at any instant of time, other than to set up the next operation in the printing process.

However, under several conditions, the drive mechanisms may be initially turned off, and it may be desirable to detect the presence of media within the media path and to flush it out before continuing with printing. These conditions include: after boot-up of the printing system; after an urgent stop of the printing system, typically caused either by a media jam or a user's opening a sensed door in the printing system; when a device requires a mechanical initialization, i.e., the resetting of its rollers and other mechanics to a home position; and when a device determines that it has a page within its path that needs to be flushed.

The print engine is typically part of a printer which may include a built-in media input tray and which may be coupled to an optional media input device for coordinating media delivery from one or more trays of the media input device to print engine. A given printer may be couplable to several different models of media input device, each model having its own unique configuration for a media path with one or more sensors and feed mechanisms distributed along the media path. The printer may also have a built-in output tray and be couplable to several different models of media output devices, i.e., collators, binders, etc., each model having its own unique configuration for a media path with one or more sensors and feed mechanisms distributed along the media path.

DETAILED DESCRIPTION

Figure 1:
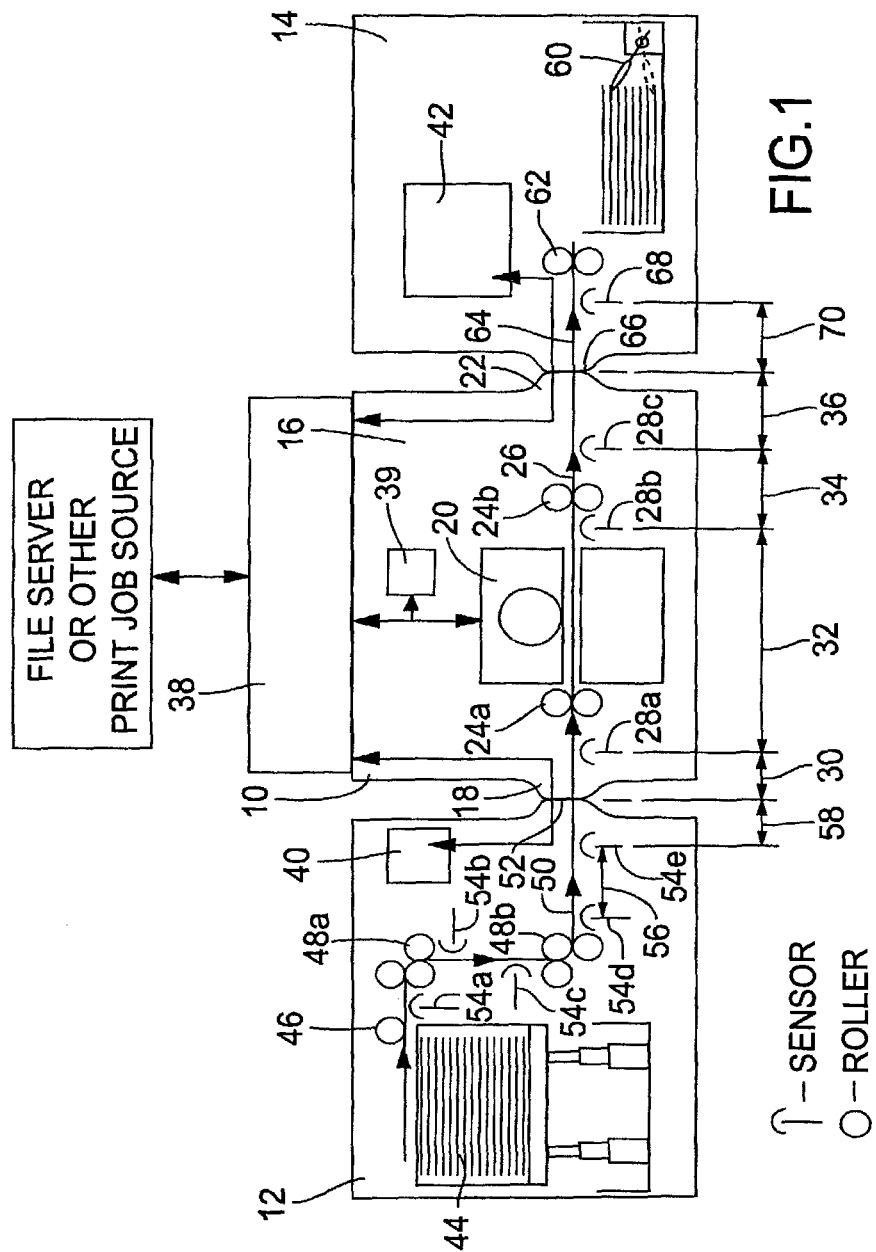
FIG. 1 is a schematic diagram of a printing device, coupled to a media input device and a media output device, and showing the media path and the sensors and feed mechanisms distributed thereon, in accordance with an example embodiment of the present invention.

As shown in FIG. 1, a printing device, such as a printer 10 may be coupled to one or more peripheral media-handling devices, such as a media input device 12 and a media output device 14. As used herein, media refers to all types of media that can be handled and printed in a printing system, including without limitation, paper of all type, card stock, vellum, transparencies, photographic stock, etc. Printer 10 may include a print engine 16 with a media inlet 18, a printhead 20, and a media outlet 22, and associated rollers 24a, 24b or other feed mechanisms. Print engine 16 thus defines a path 26 for media from inlet 18 to outlet 22.

Print engine 16 also includes a plurality of sensors 28a, 28b, 28c distributed along media path 26 for detecting media in the path. Three sensors are shown, but a greater or lesser number may be used. The sensors may be of any type for sensing media, such as mechanical vanes or photoelectric detectors. As can be seen in FIG. 1, the sensors may be separated by a distance greater than a length of media, e.g., sensor 28a and sensor 28b within print engine 16 are located on opposite sides of printhead 20, which typically is about equal in length to the longest sheet of media that can be printed in the print engine. Thus, a blind spot may exist between sensors 28a and 28b, or between others, where media can be detected only by advancing the associated rollers.

It may be seen in FIG. 1, represented schematically, that sensor 28a is located a distance 30 from media inlet 18 along media path 26. Similarly, sensors 28a and 28b are separated from one another by a distance 32, sensors 28b and 28c by a distance 34, and sensor 28c and media outlet 22 by a distance 36. Distances 30, 36 from the closest adjacent sensor 28a, 28c to inlet 28 or the outlet 22, respectively, are typically defined from an outermost point on the inlet or outlet where it will contact or butt against an outermost point on a media input device or a media output device, respectively, and the reasons for this definition will become apparent from the description below. In general, the values for distances 30, 32, 34, 36, etc. in print engine 16 will be registered in a PROM accessible by a printer processor 38, or will be reported to printer processor 38 by print engine 16, or otherwise made known to processor 38.

The print engine 16 is controlled by printer processor 38 which routes print jobs from a computer, server, or other source, and performs processing. Printer processor 38 typically monitors the status of the print engine sensors, either directly or through the print engine, which typically includes its own embedded processor 39 for controlling the print head and the feed mechanisms.

Printer processor 38 may be coupled to an embedded processor 40 within media input device 12 and an embedded processor 42 in media output device 14. Typically the communications between printer processor 38 and processors 40, 42 makes use of the JetLink protocol, and alternatively or additionally may make use of any other suitable protocol.

Media input device 12 typically includes one or more media trays, such as high-capacity tray 44 with an associated pick roller 46 and feed rollers 48a, 48b for routing media along a media path 50 that leads to an outlet 52 that may be coupled to inlet 18 of print engine 16. A plurality of sensors 54a, 54b, 54c, 54d, 54e may be distributed along media path 50 for sensing media. Five sensors are shown, but a greater or lesser number may be used.

The distances between sensors 54, e.g., distance 56 between sensors 54d and 54e, and a distance 58 from closest adjacent sensor 54e to outlet 52 of media input device 12, typically are registered in a PROM accessed by the embedded processor 40 in the media input device, and thus may be reported to the printer processor 38. Such distances in the media input device may vary for different models of media input device, all of which models may nonetheless be compatible with printer 10 by virtue of the reporting of the distances to the printer. These distances may also vary dynamically for a given model as various paths are selected from the one or more media trays to the outlet, or possibly to multiple outlets. All such variations can be reported to the printer for proper coordination of media flushing and other operations.

Media output device 14 typically includes one or more post-printing media handling devices, such as binder 60 with associated feed rollers 62 for routing media along a media path 64 that leads from an inlet 66 that may be coupled to outlet 22 of print engine 16. One or more sensors 68 may be distributed along media path 64 for sensing media. One sensor is shown, but a greater or lesser number may be used.

A distance 70 from inlet 66 to closest adjacent sensor 68 of media output device 14, typically is registered in a PROM accessed by the embedded processor 42 in the media output device, and thus may be reported to the printer processor 38. Typically, in the case where more than one sensor is distributed along media path 64 in the media output device, the distances between sensors is not of concern to printer processor 38, because it will typically coordinate flushing only up to the point where media is successfully fed into the media output device. However, in situations where the printer processor coordinates flushing through the media output device, e.g., where a second media output device is coupled in series with a first media output device, then processor 42 will know and report to the printer processor the distances between sensors, in a manner similar to that for the media input device.

Distance 70 and other distances in the media output device 14 may vary for different models of media output devices, all of which models may nonetheless be compatible with printer 10 by virtue of the reporting of the various distances and other information to the printer. These distances may also vary dynamically for a given model as various paths are selected from the inlet to one or more post-printing processors. All such variations may be reported to the printer for proper coordination of media flushing and other operations.

Thus it will be seen that paths 50, 26, and 64 define a total media path from the media input device 12 through the print engine 16 to the media output device 14. Printer processor 38 may be programmed to calculate a maximum or greatest distance (D1max) along the total media path that media can travel before reaching one of the sensors.

$$D1max = \text{the greatest of } \{D\text{sensor(input)}; (S\text{out(input)} + S\text{in(engine)}); D\text{sensor(engine)}; (S\text{out(engine)} + S\text{in(output)}); D\text{sensor(output)}\}$$

where Dsensor (input) is the maximum distance media can advance within the media input device without reaching a sensor, Sout (input) is the distance in the media input device between a device outlet and a sensor closest to the outlet, Sin(engine) is the distance in the print engine between an engine inlet and a sensor closest to the engine inlet, Dsensor (engine) is the maximum distance media can travel within the print engine without reaching a sensor, Sout (engine) is the distance in the print engine between the engine outlet and the sensor closest to the outlet, Sin (output) is the distance in the media output device between the device inlet and the sensor closest to the inlet, and Dsensor (output) is the maximum distance media can travel within the output device without reaching a sensor.

In certain cases, described herein, other values for the media output device may be defined and used in the above calculation.

The coordinated media flushing may be used in a situation where the media path is in an unknown state in terms of the location of media within the path, for example, on boot-up of the printer, or after an urgent stop due to a jam or an opened door. Another such situation occurs when the media input device or the media output device either requests a mechanical initialization to align its rollers at a home position or the device indicates it has a page to flush.

In any of these situations and others it is at least possible that a sheet of media is sitting in the media path, but is in a blind location, not triggering any sensor, and in these situations the feed mechanisms are nominally shut off, so the media remains there at risk of jamming on the next print operation. Thus, the printer may perform in these situations a coordinated flushing of the media path. A method for carrying out the coordinated flushing is shown in the flowchart in FIG. 2.

When it is determined that a coordinated flush operation is in order, printer processor 38 may send to embedded processor's 40, 42 in the media input and output devices and to print engine 16 a signal indicating a request to flush. The request to flush does not start the feed mechanisms in the devices and engines, but instead gives the opportunity for the devices and engines to respond when they are ready to flush. Printer processor 38 may wait until all of the devices and engine have responded that they are ready to flush, and then issues a coordinated flush command, which commences substantially simultaneously a flush operation in the devices and the engines. That is, the rollers and other feed mechanisms in the devices and engines are turned on in the ordinary flow direction to move any media forward in the media path, typically with the exception of the pick rollers in the media input trays that would feed new media into the path. The desired rollers of all of the devices and the engines begin turning substantially simultaneously so as to prevent media jamming that may occur when rollers at one point in the media path begin turning, but rollers that are directly downstream do not, causing the media pushed by the turning rollers to be crushed and jammed into the non-turning rollers.

Typically, printer processor 38 will select a flushing speed, e.g., the highest flushing speed that is supported by all of the media input device, the print engine, and the media output device, or a slower speed, so long as all of the devices and engine can handle it. Printer processor typically learns the speeds supported by the devices and engine from the processors embedded in the devices and engine, which may obtain the values from PROMs coupled to the processors. Printer processor 38 then uses D1max as calculated above, and determines a T1max, which is equal to D1max divided by the flushing speed, and the coordinated flush command continues in effect for at least T1max, while printer processor 38 monitors the status of the sensors in the total media path, typically by monitoring a set of media-in-path signals, one signal from each of the media input device, the print engine, and the media output device, typically relayed to printer processor 38 by the embedded processors.

In the case where no media happened to be in the media path before the coordinated flushing, e.g., on a boot-up after a clean shutdown, or after a jam wherein the user removed all the media from the media path, then the lack of media will be apparent after T1max, because none of the sensors will report media in the path throughout T1max.

In the alternate case, where at least one sheet of media was in the media path before the coordinated flushing, then sometime before or at the expiration of T1max the sheet will be moved into one of the sensors, and a media-in-path signal will be reported to printer processor 38. Once a media-in-path signal is detected during the coordinated flushing, printer processor 38 typically is no longer concerned with T1max, but instead monitors the media-in-path signals to determine when they all are again in a no-media status, while flushing continues. When the media-in-path signals return to no-media status, this is considered to indicate that either all of the media has been flushed, or at least the media has been flushed out of the device or engine where it triggered the media-in-path signal. At this point, printer processor 38 can determine if media is traveling from the media input device to the engine or from the engine to the media output device by continuing the flushing for a time of T2max, which is calculated as follows:

$$D2max = \text{the greater of } \{Sout(input)+Sin(engine); Sout(engine)+Sin(output)\}$$
$$T2max = D2max/\text{flushing speed}.$$

During T2max, printer processor 38 continues to flush and continues to check the media-in-path signals. If the media-in-path signals remain in the no-media status during T2max, then the flushing is complete. If any media-in-path signal is detected during T2max, then the flushing will need to continue until the media-in-path signals all return to no-media status followed by a successive period of flushing for T2max with the media-in-path signals remaining in the no-media status. This testing may need to continue for further cycles, depending, e.g., on whether further media output devices are connected downstream of media output device 14. It will be understood that while the embodiment described herein includes one media input device, one print engine, and one media output device, the system could be scaled to incorporate additional devices and print engines connected in series or in parallel.

During coordinated media flushing, any of the peripheral devices or the print engine may detect a media jam, an open door, or another condition that may require an urgent stop. In such cases, the device or engine may report the condition to printer processor 38, e.g., in an urgent stop request. The printer processor may in turn issue an urgent stop command to the devices and the engine, or to a subset of these as appropriate to halt flushing where necessary to prevent subsequent jams. The urgent stop command will typically stop the flushing when received. For example, if the print engine reports a jam, the printer processor may issue an urgent stop to the print engine and the media input device, while allowing the media output device to continue flushing media to its output. On restart, after an urgent stop, the printer processor may command a coordinated flushing, as described above.

After all media is flushed from the total media path, printer processor 38 may command a mechanical initialization of the print engine, the media input device, and the media output device. As described herein, the printer processor 38 generally controls the operation of the printing system by sending instructions and monitoring the signals from the embedded processor's in the media input device, the print engine, and the media output device, and typically the program for controlling printer processor will be stored in firmware on a PROM or other storage medium in machine-readable instructions. It will be understood that the control might be partitioned differently amongst the processors, and a processor or other controller other than the printer processor may be responsible for general control.

Figure 2:
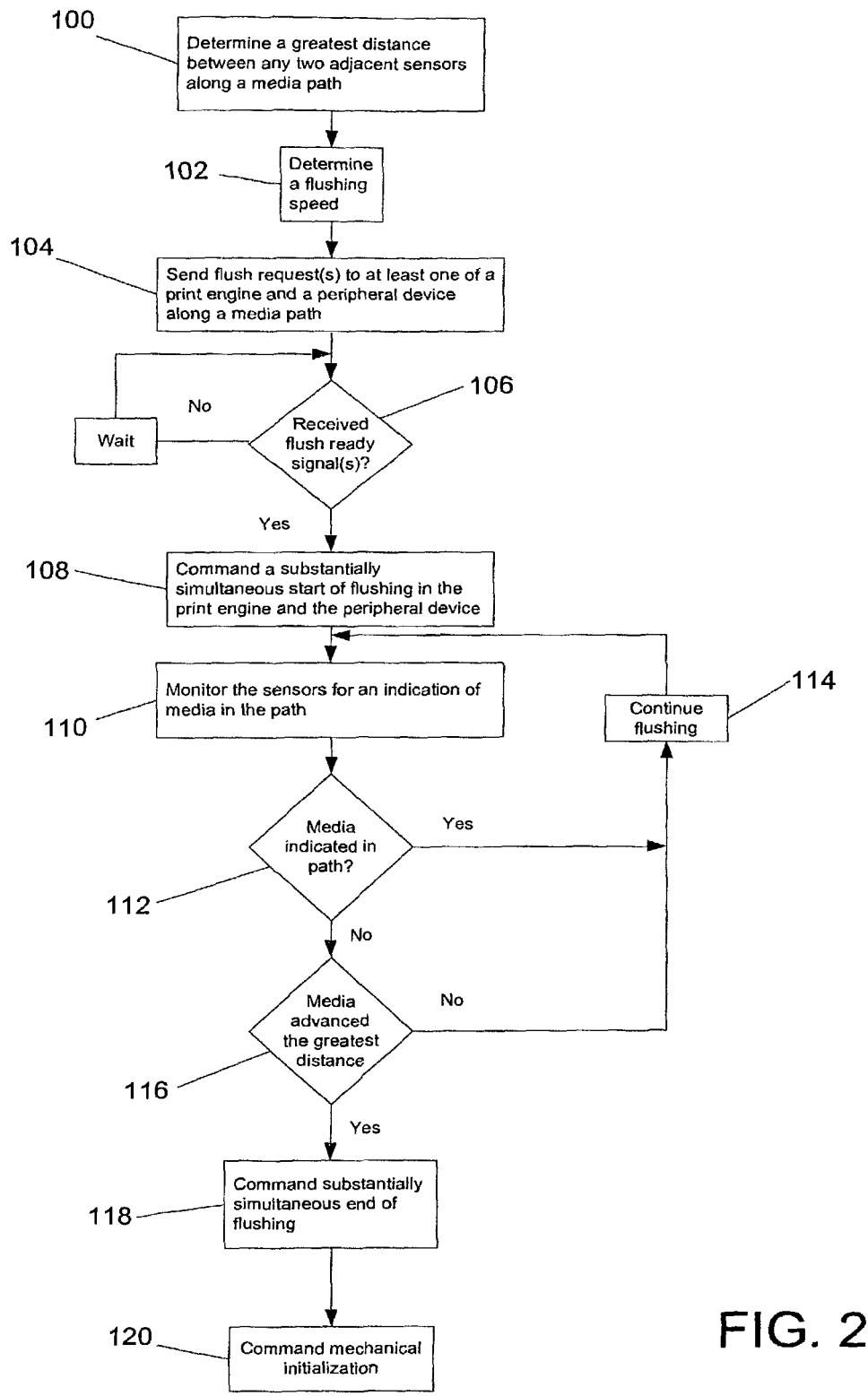
FIG. 2 is a flowchart showing a method for a printing device, including a print engine configured to be coupled to a peripheral device, to flush media from a media path within the print engine and the peripheral device, in accordance with an example embodiment of the present invention.

An example embodiment of the coordinated flushing is shown in FIG. 2, which may include a calculation, shown at 100, of the maximum or greatest distance (D1max) along the total media path that media can travel before reaching one of the sensors or the greatest distance between any two adjacent sensors along the media path, using the formulas described above. A flushing speed, for use in commanding one or more peripheral devices and the engine to flush, may be determined as shown at 102. Proceeding with the coordinated flushing, a signal indicating a request to flush may be sent to the one or more devices and to the print engine as shown at 104. Then, as shown in the loop at 106, further processing of the coordinated flushing may await the device(s) and the engine returning signals indicating they are ready to flush.

When all of the device(s) and the engine are believed ready to execute a flush, a substantially simultaneous start of flushing may be commanded in the device(s) and the engine, as shown at 108. While the flushing is ongoing, the status of the sensors in the media path are monitored for an indication of media in the path as shown at 110. If media is indicated in the path, then the flushing and monitoring may continue, as shown at 112 and 114. If media is not indicated in the path, then, flushing and monitoring may continue until the media would have been advanced the greatest distance (as calculated above), as shown at 116. Once any media would have been advanced the greatest distance without an indication of media in the path, then a substantially simultaneous end of flushing may be commanded, as shown at 118. After flushing ends, a mechanical initialization of the device(s) and the print engine may be commanded as shown at 120.

From the description it will be seen that the printer may be used with any of a plurality of models of media input devices and any of a plurality of models of media output devices. Each of the models of media input device will typically contain a plurality of sensors and be capable of reporting a maximum distance between adjacent sensors within the device and of reporting a distance between an outlet of the media input device and the closest sensor within the media input device. Each of the models of media output device will typically contain at least one sensor and be capable of reporting a distance between an inlet of the media output device and the closest sensor within the media output device.

While the present disclosure has been made with reference to the foregoing preferred embodiments, those skilled in the art will understand that many variations may be made therein without departing from the spirit and scope defined in the following claims. The disclosure should be understood to include all novel and non-obvious combinations of elements described herein, and claims may be presented in this or a later application to any novel and non-obvious combination of these elements.

What is claimed is:

1. A non-transitory article comprising:
a non-transitory storage medium having a plurality of machine-readable instructions, wherein, when the instructions are executed, the instructions provide for:
determining a greatest distance between adjacent media sensors along a media path through a print engine and a peripheral device;
determining a period of time to advance media the determined greatest distance between adjacent media sensors;
commanding flushing to advance media the determined greatest distance in the print engine and the peripheral device;
monitoring the sensors for an indication of media in the media path; and
if no media is indicated in the media path upon completion of flushing for the period of time to advance media the determined greatest distance, commanding an end to the flushing.

2. The non-transitory article of claim 1, wherein the instructions direct a processing unit to command substantially simultaneously flushing of the print engine and the peripheral device to advance the media the determined greatest distance.

3. The non-transitory article of claim 1, wherein the peripheral device defines a peripheral media path portion of the media path, wherein the print engine defines an engine media path portion of the media path between an inlet and an outlet of the engine and wherein the adjacent media sensors comprise a first sensor along the peripheral media path portion and a second sensor along the engine media path portion.

4. The non-transitory article of claim 1, wherein the peripheral device is a media input device and wherein the print engine is to receive media from the media input device.

5. The non-transitory article of claim 1, wherein the peripheral device comprises a media output device.

6. The non-transitory article of claim 1, wherein the commanding comprises sending a flush request from a processor in the print engine to an embedded processor in the peripheral device.

7. A method of flushing media from a system including a print engine and a peripheral device, wherein the print engine and the peripheral device collectively define a media path, the media path including a sensor in each of the print engine and the peripheral device, the method comprising:
determining a greatest distance between adjacent sensors along the media path;
determining a period of time to move media the greatest distance between adjacent sensors along the media path; and
in the absence of media having been detected in the media path, commanding a flushing to advance media the determined period of time.

8. The method of claim 7, further comprising:
monitoring the sensors for an indication of media in the media path; and
commanding, if no media is indicated in the media path upon completion of the determined period of time to advance media the determined greatest distance, an end to the flushing.

9. The method of claim 8, wherein the commanding includes determining a flush speed supported by both the print engine and the peripheral device, and flushing at the determined flush speed, wherein the determined the period of time is based upon the determined flush speed.

10. The method of claim 8, wherein the media path includes two or more sensors in each of the print engine and the peripheral device, and wherein determining the greatest distance includes comparing distances between a pair of sensors within the peripheral device, between a pair of sensors within the print engine, and between a pair of sensors with one of the pair in the peripheral device and another of the pair in the print engine.

11. The method of claim 10, wherein the flushing comprises a substantially simultaneous flushing of the print engine and the peripheral device.

12. The method of claim 8, further comprising, prior to the commanding the flushing, sending a flush request to at least one of the print engine and the peripheral device, and waiting, after sending the flush request, until the at least one of the print engine and the peripheral device is ready to flush.

13. The method of claim 8, wherein the peripheral device is a media input device configured to feed media to the print engine, and wherein the system further includes a media output device configured to receive media from the print engine, the media output device further defining the media path and including at least one sensor along the media path, and the media output device, and wherein determining the greatest distance includes comparing distances between a pair of sensors within the media input device, between a pair of sensors within the print engine, between a pair of sensors with one of the pair in the media input device and another of the pair in the print engine, and between a pair of sensors with one of the pair in the print engine and another of the pair in the media output device.

14. The method of claim 13, wherein the flushing comprises a substantially simultaneous flushing of the print engine and the peripheral device.

15. The method of claim 13, wherein the peripheral device defines a peripheral media path portion of the media path, wherein the print engine defines an engine media path portion of the media path between an inlet and an outlet of the engine and wherein the adjacent media sensors comprise a first sensor along the peripheral media path portion and a second sensor along the engine media path portion.

16. The method of claim 7, wherein the peripheral device is a media input device and wherein the print engine is to receive media from the media input device.

17. The method of claim 7, wherein the peripheral device comprises a media output device.

18. The method of claim 7, wherein the flushing comprises a substantially simultaneous flushing of the print engine and the peripheral device.

19. The method of claim 18, further comprising:
monitoring the first sensor and the second sensor for an indication of media in either print engine media path or the peripheral media-handling device media path after expiration of the determined greatest period of time to determine whether to end the flushing.

20. The method of claim 18, wherein the commanding includes determining a flush speed supported by both the print engine and the peripheral device, and flushing at the determined flush speed, wherein the determined greatest period of time is based upon the determined flush speed.

21. A method comprising:
determining a greatest period of time that media may travel without reaching a first sensor along a print engine media path of a print engine and a second sensor along a peripheral media-handling device media path of a peripheral media handling device and connected to the print engine media path; and commanding simultaneous flushing of the print engine and the peripheral media handling device to advance media for the determined greatest period of time; and if, after initiation of the simultaneous flushing and upon expiration of the determined greatest period of time, no media is indicated in either the print engine media path or the peripheral media-handling device media path, ending.

* * * * *